Oct. 30, 1951 N. B. WALES, JR 2,573,373
CATHODE GLOW DISCHARGE DEVICE
Filed June 14, 1949 3 Sheets-Sheet 1
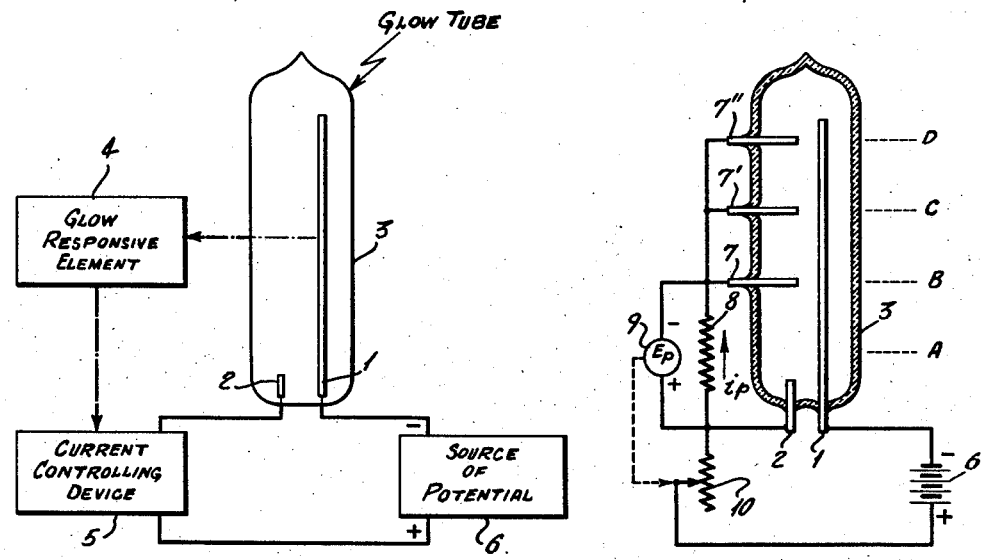
Hydrogen gas at $10^{-2}$ mm Hg.
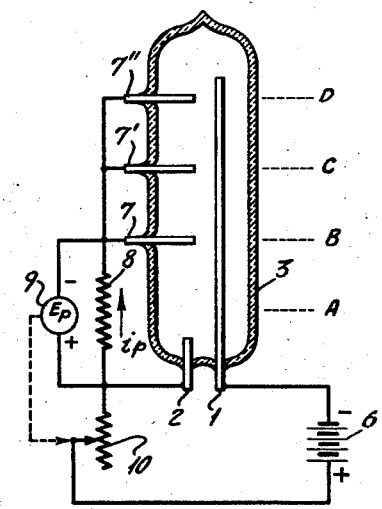
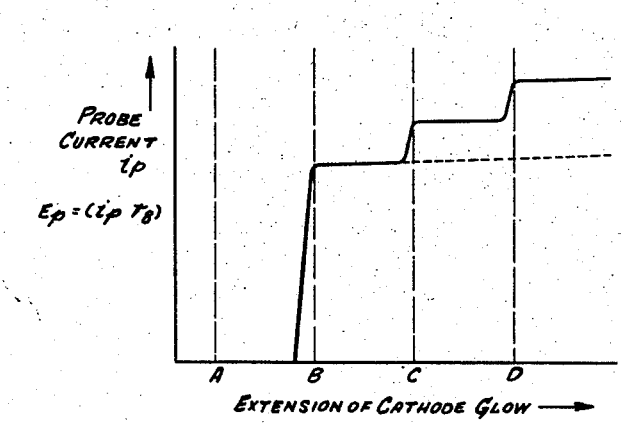
INVENTOR.
Nathaniel B. Wales Jr.

INVENTOR.
Nathaniel B. Wales

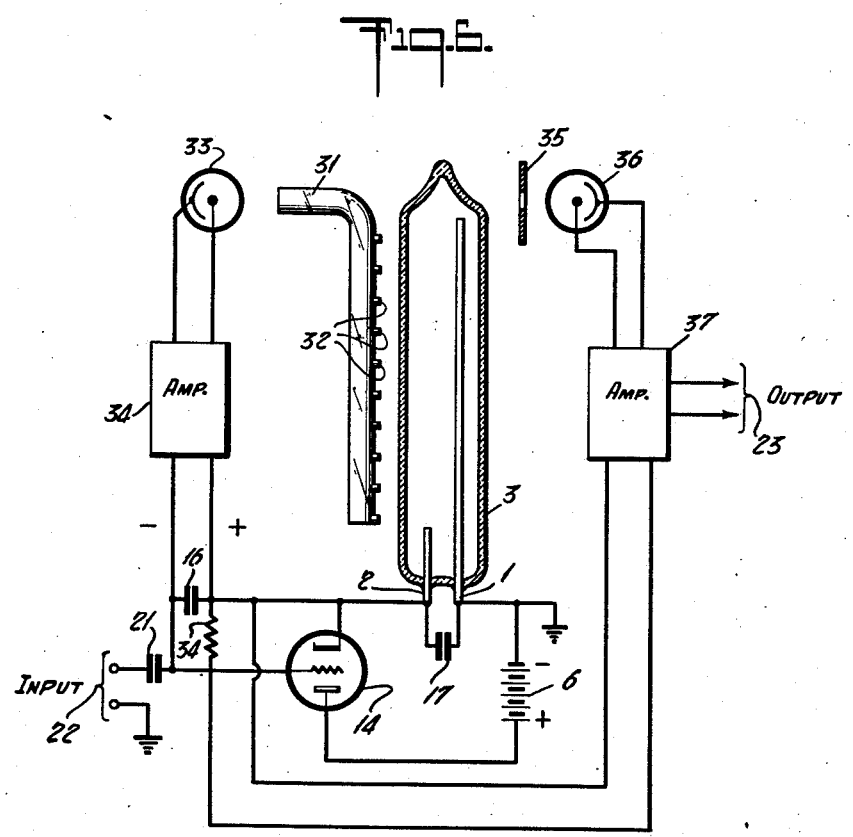

Patented Oct. 30, 1951

2,573,373

UNITED STATES PATENT OFFICE 2,573,373

CATHODE GLOW DISCHARGE DEVICE

Nathaniel B. Wales, Jr., Morristown, N. J., assignor to International Business Machines Corporation, New York, N. Y., a corporation of New York Application June 14, 1949, Serial No. 98,928

2 Claims. (Cl. 315—344)

This invention relates to a gaseous discharge device in which the spread of the cathode glow over the area of an extended cathode is made to control the current producing the glow. In the preferred form of my invention the control of the current responsible for the glow is effected by a series of probes lying along the path through which the glow tends to spread. This makes possible a device having a plurality of distinguishable states of stable electrical equilibrium, and such a device consequently lends itself for use in the field of digital calculators in which it is desired to store, add, subtract, or gate electrical pulses at high speeds.

The principle of my invention rests on the observed fact that in a low pressure gaseous discharge tube having an anode and a cold cathode, there exists a range of anode to cathode currents in which the area of cathode covered by the observed glow is a function approximately proportional to this current. Thus, if the cathode is of an extended form, such as a rod, and a relatively small anode is located close to one end of this rod, it is observed that at the initiation of discharge a cathode glow will form at the portion of the cathode nearest the anode, and, with increasing current, the glow will progressively spread along the rod away from the anode. The boundary of this glow is quite sharply defined and, by suitably limiting the discharge current, this boundary can be made to remain stable at any position along the rod. Further, this extended cathode need not lie in a straight line but may be curved or shaped in any desired manner.

My invention consists of placing along this path of glow extension one or more devices responsive to the proximity of the glow phenomenon, and causing these glow responsive devices to act as sequential barriers to the extension of the glow past these devices, by causing these devices to limit or control the glow discharge current in response to the proximity of the glow, thereby providing a sequence of stable glow positions. A simple and preferred form of glow responsive device comprises a probe electrode which is sufficiently electrically isolated from the main discharge electrodes, such as by a high resistance, so as not to disturb the glow discharge appreciably. It is observed that as the boundary of the cathode glow approaches such a probe electrode, a very appreciable potential will appear across such an isolation resistor. The magnitude of the current producing this probe potential across the probe resistor may be of the order of a few microamperes, in contradistinction to the main anode-cathode glow current, which may be several milliamperes. Furthermore, it is observed that the amplitude of probe current is approximately proportional to the area of probe exposed to the glow. This fact makes possible the use, instead of a series of individual probe electrodes, of a single comb-like probe electrode having a periodically variable area with respect to the progressive probe area encountered by the extending glow, in order to provide a series of counting "plateaus." With such a stepped probe electrode the continuous extension of the cathode glow is accompanied by a discontinuous or stepped increase of the probe current, which then may be made to control the anode-cathode current for producing the desired plurality of stable counting stages.

Alternative to the use of a probe electrode as the glow responsive device, it is possible to use a photo electric device which is responsive to the light emitted by the glow of the cathode discharge. A suitable stepped optical system or mask may be used in this connection to provide the desired multiple counting states.

An object of this invention is to make possible the fabrication of a simple, compact, and inexpensive decade high speed electronic counter which yields direct reading of its register of input pulses, and yet which is highly reliable.

A second object is to provide an electronic counting tube which requires a minimum of auxiliary equipment to sustain reliable operation and to operate in cascade.

A third object is to make available a counting device in which the register is accessible not only visibly but also as a discontinuously variable electrical parameter proportional to the register of the device.

A fourth object comprises the minimization of deionization time as a limiting factor in the speed of gas tube counter response.

A fifth object is to provide a new principle for gaseous discharge counting devices which is not dependent on critical surface conditions, close geometric tolerances, or exact regulation of its power supply, to insure reliable operation.

Other objects are implicit in the following specification and claims.

The drawings disclose several embodiments of my invention, and, for this reason, like numerals appearing in the several figures, refer to analogous parts. In the drawings;

Fig. 1 is a schematic block diagram illustrating the functional relations between the essential elements of the invention;

Fig. 2 is the schematic diagram of a multiple probe tube and associated circuit for illustrating the observed phenomena of probes responsive to the extensible glow boundary of a cold cathode;

Fig. 3 is a graphical presentation of the observed phenomena observed with the device of Fig. 2;

Fig. 6 shows an embodiment of my invention utilizing a photoelectric system as its glow responsive device.

Figure 4:
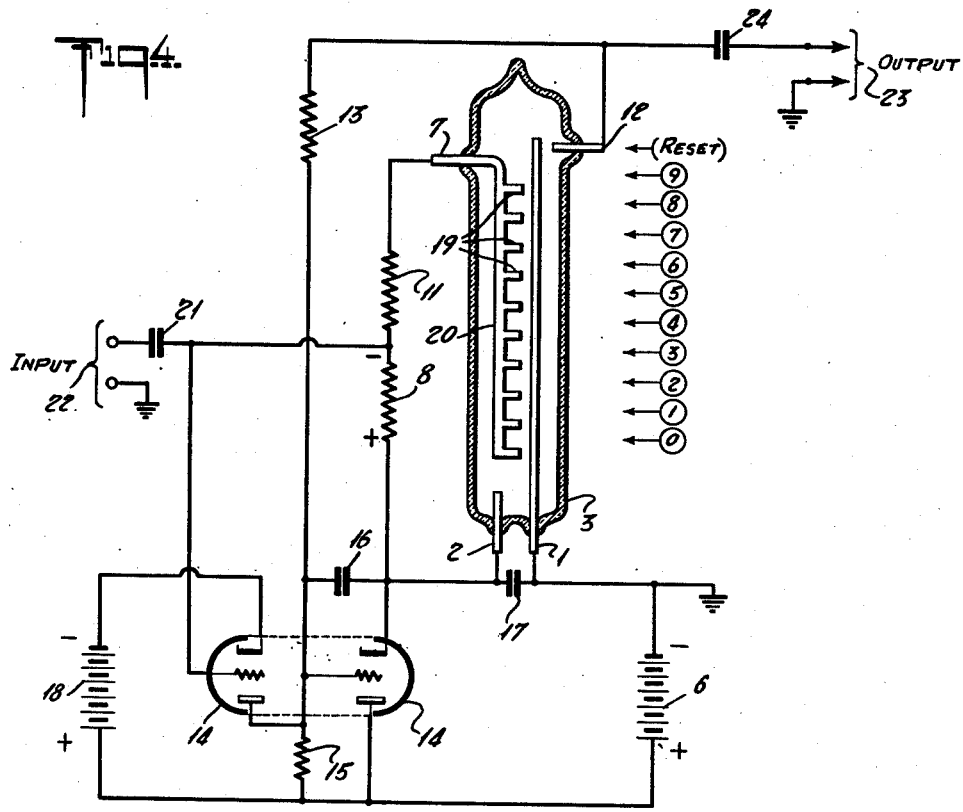
Fig. 4 shows in schematic form the preferred embodiment of my invention in the form of a self-resetting decade counter.

In Fig. 1, the schematically indicated low pressure gas tube envelope 3 is shown to contain an extended rod form of cold cathode 1, and a relatively short anode 2 positioned near one end of cathode 1. The gas in the tube may be any stable gas which is non-reactive with the elements or envelope. Hydrogen has been found to be preferable due to its low de-ionization time and single state of ionization. The pressure may be on the order of $10^{-2}$ mm. of mercury.

In the absence of limiting activity by the current controlling device 5, the source of potential 6 will cause a discharge to initiate at the lower portion of the tube between elements 1 and 2, and the consequent glow appearing at the base of cathode 1 will very rapidly spread over its area thus causing the glow boundary to rise. The approach of the glow to the neighborhood of the glow responsive device 4, however, sets up a signal which is transmitted to current controlling device 5 so as to limit the glow current and thereby form a barrier to the further rise of the glow. It is this principle and its elaboration which comprises my invention.

The system shown in Fig. 2 demonstrates the phenomena involved in the use of probe electrodes lying in or near the path of a progressively extended glow discharge. The glass envelope 3 has the extended cold cathode rod 1 and short anode rod 2 sealed through one end thereof. The probe electrodes 7, 7', and 7'' are sealed through the sides of the tube so as to approach but not touch the cathode rod 1 at discrete intervals. The gas and pressure conditions are those suitable for glow discharge as outlined before. Probes 7, 7', and 7'' are externally electrically connected together and thence connected to the anode through the high valued resistor 8 (for instance, 20 megohms). The high impedance voltmeter 9 which is connected across the probe resistor 8 thus inferentially measures the probe—anode current, $i_p$.

When an adequate source of potential 6 (i. e., 500 to 1000 volts, depending, of course, on the electrode spacing, gas, and pressure) is impressed across the discharge electrodes 1, 2, through the limiting rheostat 10, discharge will initiate and a cathode glow will spread upward to cover an area determined by the current limit imposed by rheostat 10. As the glow current is increased by diminishing the value of 10 the boundary of the glow will move upward. For separate probes and an appreciable spacing between the first probe and the anode 2, no probe current $i_p$ will be observed until the boundary of the glow is very close to the first probe. At this point (B, Fig. 3) there will be an abrupt rise in $i_p$ (cf. about 2 microamperes) as shown graphically in Fig. 3. As the glow is extended further, a very gradual rise in current is observed until the glow reaches probe 7' (at C on the graph) where a second abrupt rise (but of less magnitude than the initial rise) is observed. This phenomenon is repeated with an equal step in $i_p$ for probe 7''. It is implied from this observation that the probe current $i_p$ is an approximately proportionate function of the area of probe embraced in the glow. Other experiments have extended the confirmation of this conclusion. For instance, if the subsequent probes 7' and 7'' are left disconnected from resistor 8, the broken line curve $i_1$ representing the current from probe 7 alone results. Similar curves having only one knee occurring at the coincidence of probe and glow boundary are observed for each individual probe. It is to be noted that probe to cathode currents are observed and could be used for glow responsive criteria, but are less pronounced or defined, and thus less desirable than the probe to anode currents discussed.

From these observations it is evident that either a series of probes or a single probe parallel to the extended cathode, but having a discontinuously variable area, will form a glow responsive device in which the total probe current exhibits discrete steps.

This concept is incorporated in the decade counting device disclosed in Fig. 4, in which the glass envelope 3 contains the extended cold cathode rod 1, a short anode rod 2, a reset probe 12, and the multiple step probe 7. The latter consists of a common small diameter spine 20, on which are located at equal intervals the ten probe fingers 19. The gas and pressure conditions are the same as described previously.

Associated with the glow tube of Fig. 4 is a current controlling vacuum tube 14 and a direct current amplifier tube 14', both incorporated in a single duo-triode envelope. It may be seen that current from battery 6 can flow between anode 2 and cathode 1 in an amount controlled by the potential of the grid of triode 14 with respect to its cathode. This grid potential is in turn determined by the potential of the grid of the amplifier tube 14' with respect to its cathode. Load resistor 15 and battery 18 complete the amplifier. It may be seen that a negative potential appearing across probe resistor 8 due to current from the probe 7 via series resistor 11 is impressed on the grid of triode 14', thereby diminishing the plate current through load resistor 15. This in turn makes the grid of triode 14 more positive relative to its cathode, and an increased flow of current between anode 2 and cathode 1 results, with the attendant rise of the position of the glow boundary. Condenser 17 is connected between the anode 2 and cathode 1 to prevent transient or unstable changes of the cathode current. The reset probe 12 is connected via resistor 13 to the grid of the control triode 14 so that negative potentials appearing at 12 reduce the glow current and lower the glow boundary. The purpose of condenser 16 is to prolong such resetting pulses appearing at probe 12 until the glow has receded to the zero or index position. For this reason, the time constant associated with condenser 16 should be larger than that associated with stabilizing condenser 17.

Figure 5:
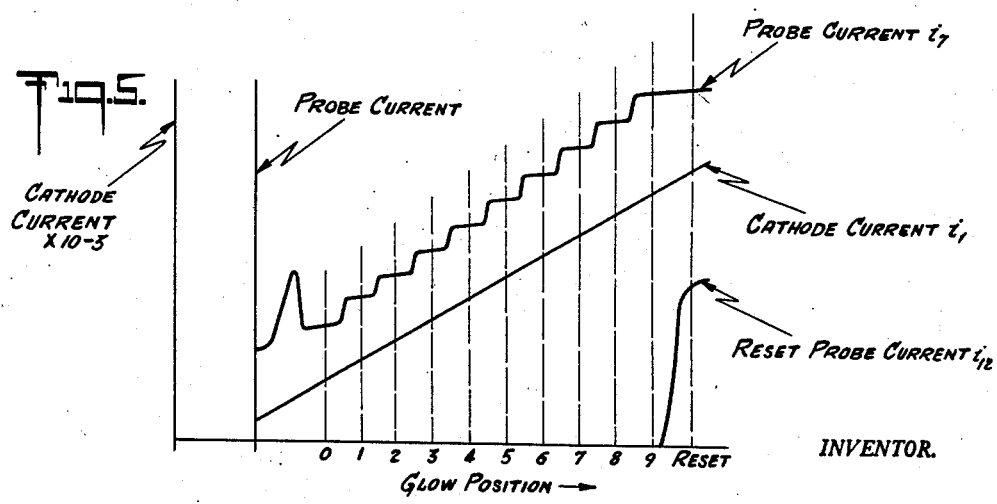
Fig. 5 illustrates in graphical form the electrical operation of the device of Fig. 4.

In operation, negative pulses to be counted are impressed across terminals 22. Such a negative pulse, which is presumed to be of predetermined amplitude, appears on the grid of tube 14' via input condenser 21. This action results in an increased glow current and consequently in a displacement of the glow boundary upward by a distinct amount determined by the choice of amplitude for the input impulses. However, with each step upward of the glow an increased probe current results due to the additional area of the next successive probe finger 19 which is embraced by the glow. This increase of probe current makes the grid of triode 14' more negative, and the cathode glow current is thereby increased so as to compensate for the additional cathode current required to maintain the glow discharge at the increased level. This step by step increase of probe current together with the direct increase of cathode current for increasing boundary displacement are shown in Fig. 5. Two scales of current magnitude are shown, since the probe currents are a very small fraction of the cathode current. Evidently, the duration of the input pulses must be such that the time constants of condensers 16 and 17 permit the glow boundary to approach its new position of equilibrium for the next higher "plateau," and yet this pulse duration must not be so great as to permit a glow extension of more than one step. Each position of equilibrium is maintained by virtue of the choice of the circuit parameters in such a way that within the plateau of probe current lying between two steps, and during which the probe current is approximately constant, there will be a value of cathode current, which will be satisfied by the relatively constant grid potential of triode 14' produced by this plateau probe current across resistor 8. This will be the position of equilibrium, since if the glow discharge moves incrementally upward it will not change the grid potential of triode 14' appreciably, but it will require a larger cathode current which is not available for the given biassing of the control tube. It is in this sense that the action of the probe as a glow responsive device is referred to as that of a "barrier." Conversely, if the discharge boundary moves downward, it would require a lesser cathode current than that made available by the control tube. For this reason, the glow boundary will stay in stable equilibrium between any pair of the multiple steps provided. The reason the probe current remains relatively constant between steps is because the positioning and small area of the spine 20 of probe 7 cause very little change of the electrode area embraced in the glow for a given displacement of the glow boundary, as compared to the large change of probe area exposed to the glow when one of the fingers 19 is encountered by the glow.

It is to be noted in this connection that although the preferred embodiment of Fig. 4 shows a simple rod cathode cooperating with a stepped probe to yield the multiple states of equilibrium, it is equally possible to use a rod probe and a stepped cathode to attain the same result. The scope of my invention includes this reciprocal alternative.

As the successive pre-shaped input pulses thus cause the step by step ascent of the glow along the predetermined number of stable states, the boundary of the glow will eventually reach the reset probe 12. In a decade counter this will be on the tenth pulse. At this point a large negative potential will appear at probe 12 and this will be impressed on the grid of control tube 14, thus dropping the cathode current and glow boundary. It has been found that the probe current, for the geometry shown, exhibits a peak shown at X in Fig. 5 at the position of the glow just approaching the bottom extremity of the probe electrode 7. This is a useful penomenon since it forms a "backstop" for the resetting operation which makes it unnecessary to extinguish the discharge throughout the counting operations. This makes possible a much higher speed of counting than would be possible if the deionization time had to be provided for in choosing the time constants of the circuit and the value of the input pulse interval.

The same negative pulse appearing at probe 12 in the resetting operation is also passed on through condenser 24 to the output terminals 23. If these are connected to the input terminals of an identical counter decade, a cascade operation will result in which each reset of the first counter will generate a pulse suitable for registering one additional count on the succeeding counter.

In Fig. 5 it may be noted that probe current starts coincidentally with the discharge, in contradistinction to the condition in Fig. 3. This appears to be a function of the proximity of the end of the probe to the anode in this design.

As a refinement of the design shown in Fig. 4, it is evident that an auxiliary probe electrode similar to probe 7 of Fig. 4 but having its fingers lying between the positions of the fingers 19 may be introduced into the tube 3 to allow an "escapement" type of operation to be performed. In this case, a gate tube would be arranged electrically to connect a portion of the potentials appearing at this escapement probe to the grid of tube 14. This gate tube would be opened only during the presence of the input pulse so that the glow is positively prevented from making more than one step per pulse by the temporary barrier action of this auxiliary escapement circuit. This would make the counter independent of the duration of the input pulses (in the positive sense).

However, by simple clipping and shaping circuits well known in the art, it is possible to so adjust the input pulses in terms of the fixed time constants of the system of Fig. 4, that this will comprise a reliable counter.

In Fig. 6 a form of my invention is shown which utilizes photoelectric cells as the glow responsive devices. The glass envelope 3, in this system, contains only the short anode 2 and the extended cathode 1 under suitable gas and pressure conditions for the cathode glow phenomenon. A moulded transparent plastic light manifold 31 serves as a stepped light pickup device capable of transmitting discontinuously increasing amounts of light from the glow on cathode 1 to the photoelectric cell 33 as the anode to cathode current in the tube is increased so as to produce a continuous rise of the cathode glow boundary. The stepped character of this light delivery is made possible by the integrally moulded protuberances 32 which allow light from the glow to enter the manifold normally only at discrete areas. This stepped light increase experienced by cell 33 is analogous to the stepped probe current shown in Fig. 5. Evidently, alternative to this preferred form of optical system, any masking device and optical pickup arrangement which yields a photoelectric response related to the extension of the glow along the cathode is suitable for executing the invention.

Serving the purpose of a reset probe, the apertured mask 35 together with reset photo cell 36 will form a device responsive to the glow only when it reaches the reset position.

In this form of my invention the battery 6, tube 14, and stabilizing condenser 17 all perform the same functions as in the device of Fig. 4. Conventional D. C. amplifier 34 is arranged to amplify the photoelectric output of cell 33 and to apply this signal with suitable polarity to the grid of control tube 14 so that an increased light input to cell 33 due to the proximity of the glow to a pickup aperture 32 will decrease the negative bias normally supplied by the amplifier 34 on the grid of tube 14, thereby making available an increased cathode glow current to sustain the new equilibrium position. Conversely, photoelectric currents from reset cell 36 are amplified in amplifier 37 so as to produce across resistor 34 a potential, making the grid of tube 14 more negative for a sufficient time to reset the glow to its index or zero position. At a suitable stage in amplifier 37 an output potential of the correct amplitude and polarity to serve as input impulses to a successive cascade stage is made available to output terminals 23, so that an output pulse of this nature will be generated on each reset operation.

In operation, the photo-electronic counter of Fig. 6 causes pre-shaped positive input pulses of constant amplitude appearing at input terminals 22 to advance the glow boundary transiently. This advance is followed by an increase in the light from the glow reaching photo cell 33. As a result, the increased cathode glow current necessary to sustain this advance is made available by the consequent control of tube 14 by the decreased bias supplied by amplifier 34. A position of equilibrium is sought out by the glow boundary for each of these steps at which the relatively constant bias on tube 14, due to the approximately constant light input to cell 33 within a given step, balances the variable glow current corresponding to the variable boundary position. After accumulating a predetermined number of such pulses the light from the glow boundary will reach the reset cell 36 and the glow will be depressed to the zero position with an accompanying output pulse.

It may be noted that my invention can equally well be effected by using an optical pickup giving an output directly proportional to the height of the glow, in conjunction with a stepped cathode in which the height of the glow boundary is discontinuously related to the cathode current.

What I claim is:

1. In a counter including a gaseous discharge storage tube wherein a preselected boundary of glow discharge is progressively expanded in step-by-step fashion into successive stable positions in response to consecutive pulses to be counted; an envelope containing a gaseous atmosphere; an elongated cathode extending within said envelope; an anode extending within said envelope in juxtaposition with said cathode adjacent one end thereof; means for creating a voltage difference between said anode and cathode to create a glow discharge therebetween; a single probe electrode arranged within said envelope in juxtaposition with said cathode and having a discontinuously variable area to form a preselected number of probe fingers protruding toward said cathode; a source of pulses to be stored; and circuit means connected between said source and said single probe electrode for applying a potential to said single probe electrode whereby each pulse to be stored effects an expansion of said boundary of glow discharge to include the next probe finger adjacent to said boundary of glow discharge until all said fingers are included within said boundary, the current through said probe electrode increasing approximately an equal amount with each expansion of said glow discharge.

2. In the counter set forth in claim 1, a reset electrode extending within said envelope in spaced relation to said elongated cathode so that the expansion of the boundary of glow discharge to include the probe finger nearest thereto effects a voltage change at said reset electrode; and voltage transferring means connecting said circuit means and said reset electrode whereby the current through said circuit means is decreased to effect a contraction of said boundary of glow discharge.

NATHANIEL B. WALES, Jr.

REFERENCES CITED

The following references are of record in the file of this patent:

UNITED STATES PATENTS

| Number | Name | Date |
| --- | --- | --- |
| 1,879,688 | Jenkins | Sept. 27, 1932 |
| 2,103,022 | Senauke | Dec. 21, 1937 |